(12) United States Patent
Bahn

(10) Patent No.: US 7,162,728 B1
(45) Date of Patent: Jan. 9, 2007

(54) SYSTEM AND METHOD TO PROVIDE AUDIO ENHANCEMENTS AND PREFERENCES FOR INTERACTIVE TELEVISION

(75) Inventor: Catherine Bahn, Seattle, WA (US)

(73) Assignee: Digeo, Inc., Kirkland, WA (US)

( * ) Notice: Subject to any disclaimer, the term of this patent is extended or adjusted under 35 U.S.C. 154(b) by 890 days.

(21) Appl. No.: 09/823,946

(22) Filed: Mar. 30, 2001

(51) Int. Cl.
*H04N 7/10* (2006.01)
*H04N 7/173* (2006.01)

(52) U.S. Cl. ............................ 725/36; 725/32; 725/61; 725/87; 725/134

(58) Field of Classification Search ................ 725/32, 725/36, 37, 74, 78, 82, 86, 87, 112, 134, 60, 725/61; 709/219; 705/14, 26, 27
See application file for complete search history.

(56) References Cited

U.S. PATENT DOCUMENTS

| | | | |
|---|---|---|---|
| 5,451,998 A | 9/1995 | Hamrick | |
| 5,539,449 A | 7/1996 | Blahut et al. | |
| 5,917,810 A | 6/1999 | De Bot | |
| 5,977,964 A | 11/1999 | Williams et al. | |
| 6,106,399 A * | 8/2000 | Baker et al. | 436/42 |
| 6,192,341 B1 * | 2/2001 | Becker et al. | 704/271 |
| 6,909,726 B1 * | 6/2005 | Sheeran | 370/468 |
| 6,963,898 B1 * | 11/2005 | Yoshimine et al. | 709/203 |
| 7,103,905 B1 * | 9/2006 | Novak | 725/46 |
| 2001/0027560 A1 * | 10/2001 | Simon | 725/1 |
| 2001/0044751 A1 * | 11/2001 | Pugliese et al. | 705/26 |
| 2002/0092019 A1 * | 7/2002 | Marcus | 725/37 |
| 2002/0103822 A1 * | 8/2002 | Miller | 707/501.1 |
| 2002/0112035 A1 * | 8/2002 | Carey et al. | 709/219 |
| 2003/0040962 A1 * | 2/2003 | Lewis | 705/14 |

* cited by examiner

*Primary Examiner*—Kieu-Oanh Bui
(74) *Attorney, Agent, or Firm*—Darby & Darby PC; M. David Ream

(57) ABSTRACT

Audio enhancements can be provided for a shopping channel of an interactive television system. The audio enhancements allow a viewer of the shopping channel to customize the audio portion of the shopping experience, as well as providing the viewer with instructional voiceovers. The audio enhancements can be uploaded by the user, and then selected from a list of enhancements that are made available via the shopping channel. Implicit or explicit profiling may also be used to determine the audio enhancements to present to the user on the shopping channel.

34 Claims, 4 Drawing Sheets

SYSTEM AND METHOD TO PROVIDE AUDIO ENHANCEMENTS AND PREFERENCES FOR INTERACTIVE TELEVISION

TECHNICAL FIELD

This disclosure relates generally to user-selected audio preferences, and in particular but not exclusively, relates to user customization of audio to accompany content on an interactive television system.

BACKGROUND

Multimedia content provided over conventional television systems or over the Internet offer little or no ability for the user to modify the audio accompanying this content. In a television broadcast, the user cannot change the audio portion of the broadcast. The audio content of the television broadcast is predetermined before reaching the television viewer and allows no customization by the television viewer.

At many Internet web sites, there is no audio available while viewing web page content. An Internet user sometimes can select an MPEG type file to be downloaded or streamed to their computer. In these cases, however, the user is not provided methods to change the audio portion of the multimedia presentation, but rather, is passively receiving audio content that has been pre-selected for the web site by its operator. Some Internet web sites provide background music while a user is viewing its web pages. However, such web sites typically do not offer the user the opportunity to select from different choices of music. In many situations, the music turns off when the user changes to a different web page of the web site, such that the music does not accompany the perusal through the entire web site. Sometimes, the only option available to the user is to turn the music off or on, and even then, it is often difficult for the user to turn such audio off—the audio launches automatically upon opening of the web page or controls for the music are difficult to locate and use.

Some web sites provide a pre-recorded human voice, upon user request, to give audio instructions that aid the viewer in navigating their site. These sites, however, offer little or no ability for the user to modify the human voice audio content to their personal preferences. The user cannot select different human voices (e.g., male, female, male child, etc.) or otherwise personalize what the pre-recorded human voice says.

Thus, while some Internet web sites do offer audio content and some simple control over the audio content, customization to suit a particular user's preferences are often lacking. As described above, user customization of audio content for television is virtually unavailable.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments of a method and system to allow user customization of audio content on interactive television are described herein. In the following description, numerous specific details are provided, such as the description of the system and various components, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, an embodiment of the invention provides a user the ability to select the audio accompanying content viewed on an interactive television system. For example, the user can elect to listen to jazz style music while viewing content on a shopping channel accessed over interactive television. Alternatively or in addition, the user can be provided with an instructional voiceover that guides the user through a purchase experience on the shopping channel. In accordance with an embodiment of the invention, the music selections or instructional voiceovers can be uploaded by the user to a server, and then played on the shopping channel (or other channel) when the channel is later viewed. The music or voiceovers can be selected from a menu, preset to play automatically, or can play in response to clicking an icon or other visual indicator. Implicit or explicit profiling may also be used in an embodiment to determine the music or voiceover to play to the user.

Figure 1:
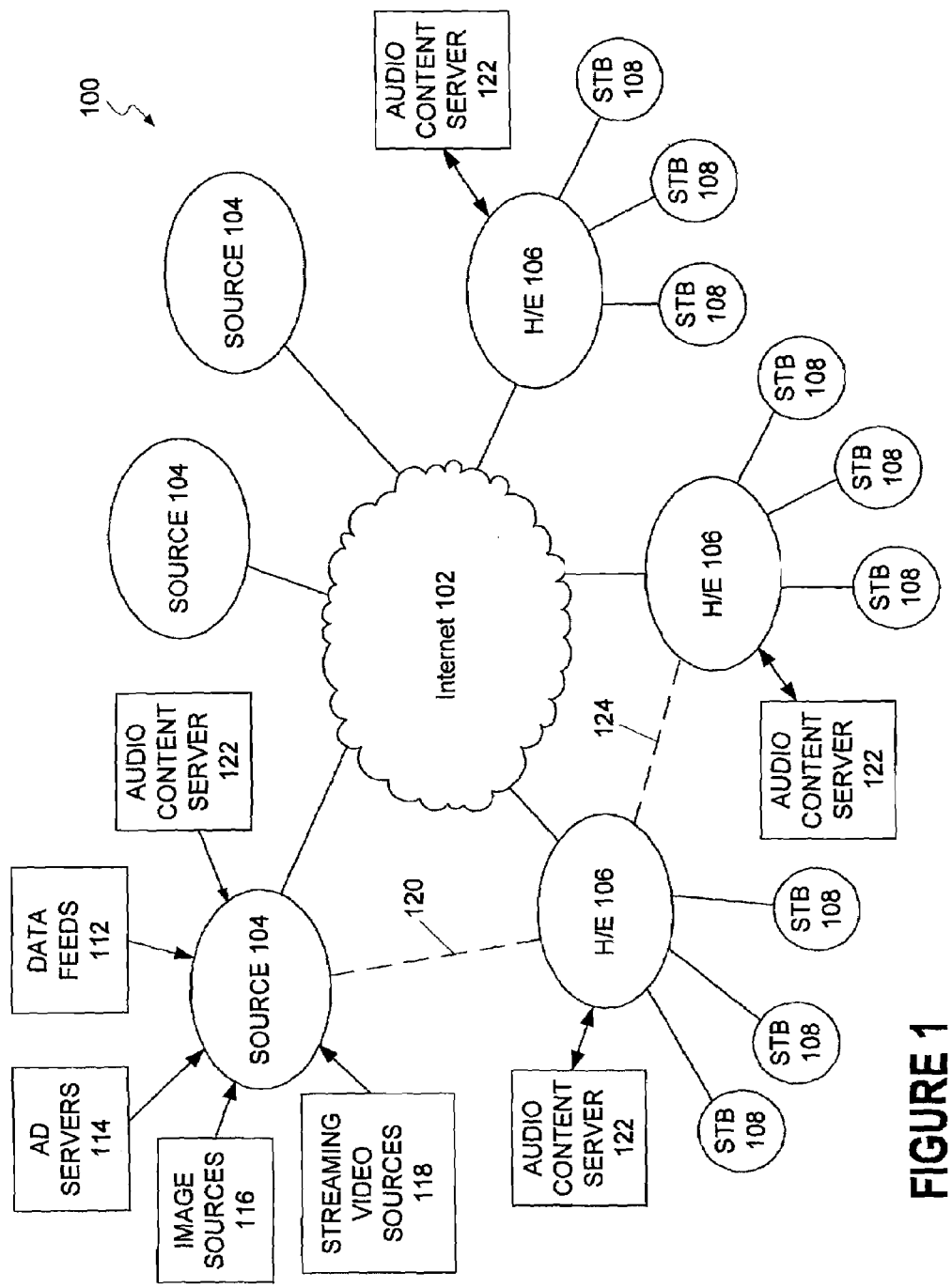
FIG. 1 shows an example of a system that can implement an embodiment of the present invention.

FIG. 1 is a block diagram depicting a system 100 for distributing television content and Internet content in accordance with an embodiment of the present invention. The system 100 can be integrated with a cable television distribution system. The system 100 includes an Internet 102, a plurality of content sources 104, a plurality of distribution centers (depicted as head-ends or H/E) 106, and a plurality of client terminals (depicted as set top boxes or STB) 108. In addition, a content source 104 is depicted as receiving data from remote data feeds 112, advertisement servers 114, image sources 116, streaming video sources 118, and audio content servers 122 or other sources/servers. In one embodiment, caches and/or servers including, for example audio content servers 122 or the like, can also be coupled to head-ends 106.

In the embodiment shown in FIG. 1, the plurality of content sources 104 is coupled to the Internet 102. For example, a content source 104 may comprise a web site portal such as Go2Net.com, or a news web site such as CNN.com, or other types of sources. Each content source

104 may have various data feeds 112, servers 114/122, and sources 116/118 coupled to it.

For example, news or stock quote feeds 112 may be fed into the content source 104. Servers 114 may provide advertisements for insertion into multimedia content delivered by the content source 104. Servers 122 may provide storage of content, such as stored audio content, stored television content, stored Internet content or the like, which may be later provided over communications channels or networks 120 or the Internet 102 on demand to distribution centers 106. Sources 116/118 may provide images 116, streaming video 118, and other content to the content source 104. Various other feeds, servers and sources may also be coupled to the content source 104.

The Internet 102 comprises a network of networks and is well known in the art. Communications over the Internet 102 are accomplished using standard protocols such as transmission control protocol/internet protocol (TCP/IP), hypertext transfer protocol (HTTP), file transfer protocol (FTP), or other protocols. The Internet 102 is coupled to the plurality of distribution centers 106 (which may comprise a cable head-end), and each distribution center 106 is in turn coupled to a plurality of client terminals 108. As examples, the client terminal 108 may comprise a set top box (STB), a personal computer, an interactive television set, a conventional television set, an audio device, a wireless device (such as a cellular telephone), or another type of communication device.

It is noted that the Internet is chosen as an example of a data communications network because it is a well-established network, and connectivity to the Internet is easily made. However, it is noted that a global communications network, such as the Internet, is not required to practice other embodiments of the invention. A locally provided and maintained communications network may be used in an embodiment.

In alternative or in addition to the Internet 102 being used to distribute multimedia content from the content sources 104 to distribution centers 106, communications channels or networks 120 apart from the Internet 102 may couple one or more content sources 104 to one or more distribution centers 106. One example of such an alternate path for communications is illustrated by the first dashed line 120 in FIG. 1. Other configurations are also possible and meant to be included within the scope of the present invention, such as a peering connection between distribution centers 106 illustrated by a second dashed line 124 in FIG. 1.

The audio content servers 122 coupled to the distribution centers 106 may include (or be coupled to) caches. Such caches may be used to increase the performance in the delivery of audio content to the client terminals 108. For example, files for audio and other high-bandwidth content may be stored in such caches, which may be closer to the client terminals 108 than to the content sources 104. In addition, reliability and guaranteed bandwidth may be provided because the Internet 102 is not in-between such caches and the client terminals 108.

Figure 2:
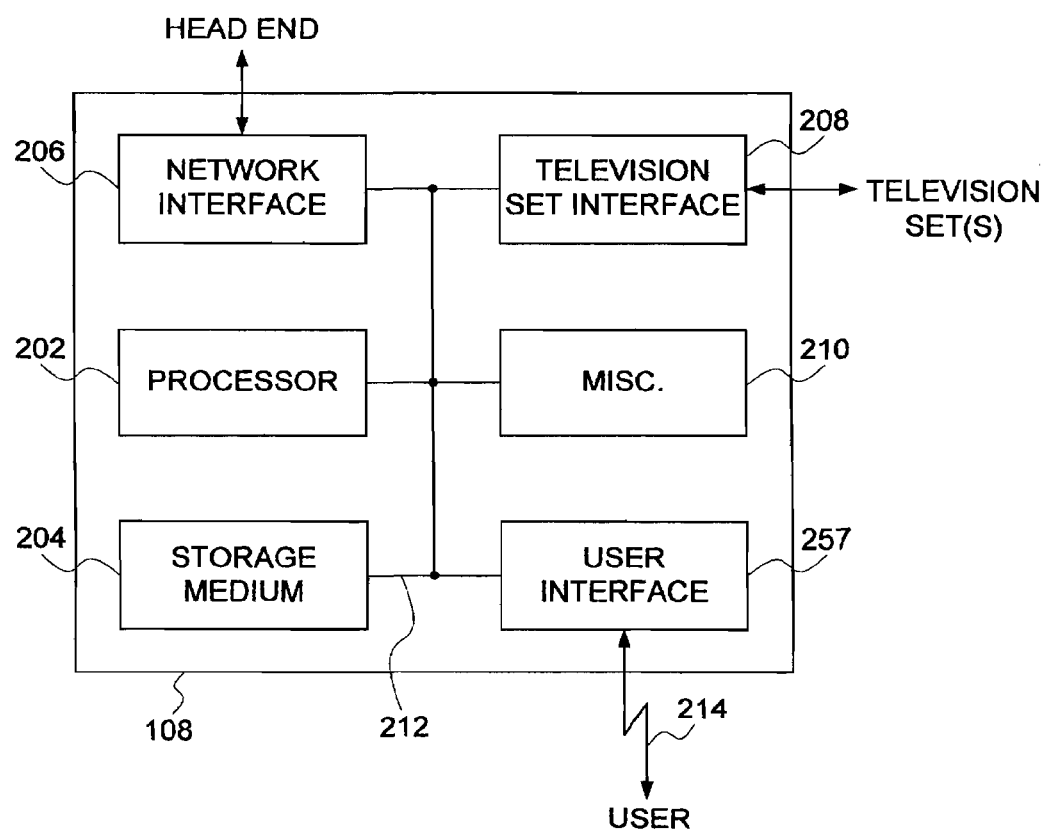
FIG. 2 is a block diagram of an example client terminal for the system of FIG. 1 that can implement an embodiment of the present invention.
Figure 3:
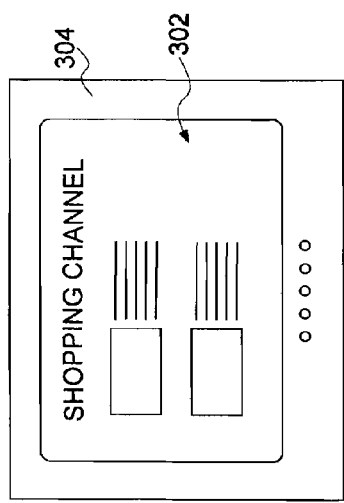

In accordance with one embodiment of the invention, different or multiple portals may be used to access the information provided through the interactive video casting systems of FIGS. 1–3, based on the type of client terminal being used by the end user. That is, for example, a television portal may be provided for an end user that uses the television set 154 to access the information. A PC portal may be provided for an end user that uses a PC to access the information. Portals can be provided for end users that use the cellular telephones, PDAs, audio devices, etc. to access the interactive video casting systems of FIGS. 1–3.

Such portals may be provided in several possible ways. In one embodiment, the client terminal (e.g., the end user's display device or audio device) can be suitably configured with an adapter that includes hardware and software. The adapter converts the television signals, the Internet or web page content, or other information provided from the interactive video casting system into a digitized format or other format that is compatible with the operational features of the client terminal.

In another embodiment, the cable provided 108 can deliver signals having different formats to the various client terminals, with the client terminals not necessarily having special adapters. Therefore, as an example, the cable provider 108 or other party can generate/deliver information (e.g., television programming, web page content, etc.) having a format that is compatible for end users that receive the information via the television set 154. The cable provider 108 or other party can also generate/deliver the same information (e.g., simultaneously with the television portal on the same communication link, separately on a different communication link, on-demand independent of the television portal, etc.) using a format that is compatible with end users that receive the information via PCs, PDAs, cellular telephones, etc. Thus, the term "interactive video casting system" is used to describe generally a system that can deliver video information over any network and any network-compatible device by broadcasting, multitasking, or unicasting. An "interactive television system" is one type of or one means of access to an "interactive video casting system".

FIG. 2 is a block diagram illustrating an example embodiment of a client terminal 108 in accordance with the teachings of the present invention. In one embodiment, the client terminal 108 may be referred to as a set top box (STB) and can include a user interface 257 including for example a hardwired, a wireless infrared (IR) or radio frequency (RF) transceiver or the like, that can exchange signals 214 with a remote control unit or other user input device. The client terminal 108 can be a component that is separate from a television set, or its features can be built into circuitry of the television set (e.g., an interactive television set). The client terminal 108 enables a viewer to select a television program to view and then delivers the television program to a television set.

A storage medium 204 can also be coupled to or be a part of the client terminal 108. The storage medium 204 can comprise a machine-readable storage medium such as random access memory (RAM), read-only memory (ROM), buffers, caches, memory, diskette, compact disc (CD), digital versatile disc (DVD), tape, or the like and their associated hardware, in one embodiment. In another embodiment the storage medium 204 can include a video cassette recorder (VCR). In another embodiment, the storage medium 204 can include a hard disk and provide a digital or personal video recorder (DVR or PVR) capability to the client terminal 108.

As shown in the example depicted in FIG. 2, an embodiment of the client terminal 108 also includes a processor 202 to read and execute software, machine-readable instructions, code, or other information stored in a machine-readable medium (such as the storage medium 204), with such software capable to control operations of components of (or components coupled to) the client terminal 108. In one embodiment, the information stored by the storage medium 204 can include, but not be limited to, software to operate the client terminal 108, network communication software, cached/buffered Internet content (such as uniform resource locators or URLs, web pages, applets, and the like), user input information exchanged with remote controls, or audio clips to be uploaded to the audio content server 122.

An embodiment of the client terminal 108 further includes a network interface 206, such as for example a digital cable modem or modem interface, a digital subscriber line (xDSL) interface, a satellite dish interface, an antenna to receive high definition television (HD television) broadcasts, or other suitable interface to communicate with the distribution center 106. In one embodiment, the use of an antenna or the like enables the network interface 206 to receive terrestrial broadcasts when communicating with a distribution center 106. The network interface 206 enables communications with the sources 104 and/or the Internet 102 to receive, for example, television content and Internet content. In one embodiment, the network interface 206 may include a back channel interface including, for example, a modem or the like to communicate with a communications network such as the Internet 102. A television set interface 208 provides a communication interface with a television set, a plurality of television sets, or other output devices, such as home stereo or home theater equipment or other suitable audio and/or video output equipment. Miscellaneous components 210 of the client terminal 108 can include various controls (e.g., television set volume, picture, color controls, and the like), hardware, and software related to operation of the client terminal 108, which for the sake of simplicity are not described further herein because they would be familiar to those skilled in the art having the benefit of this disclosure. Components of the client terminal 108 are coupled to each other via one or more buses 212.

FIG. 3 illustrates a user viewing items on a shopping channel 302 displayed on a television 304 via the television interactive television system 100. The shopping channel 302 shows a collection of merchants offering various products and services. The user can navigate the shopping channel 302 to view different products and services as well as gather information about the merchants. Once the user finds an item on the shopping channel 302, the user can purchase the item through the interactive television system 100. In one embodiment, the user navigates the shopping channel 302 and completes purchases using a user-input device that communicates with a client terminal 108, such as a remote control.

The shopping channel 302 can be implemented in several possible ways. In one embodiment, the shopping channel 302 can be a "synthetic channel" that is specifically created and operated by a cable service provider, multiple system operator, or other party. Merchants can subscribe to these parties to have their advertisements, storefronts, ad-fronts, URLs to the merchant's web sites, commercials, and the like provided via the shopping channel 302. The shopping channel 302 can include a televised catalog of the merchants' products, or otherwise provide access to the merchants' products for eventual perusal and purchase by the viewer.

In an embodiment, the shopping channel 302 can comprise a collection of subscribing merchants' advertisements. In another embodiment, the shopping channel 302 can be a dedicated channel for each merchant, or can provide a single point of access to "sub-channels" of various merchants. The shopping channel 302 can also be embodied as scrolling text, somewhat analogous to scrolling television program listings. The scrolling text of the shopping channel 302 can display available products of merchants. The shopping channel 302 can also be implemented to include any suitable combination of live video, recorded video, storefronts, advertisements, scrolling text, graphics, URLs, and the like.

Figure 4:
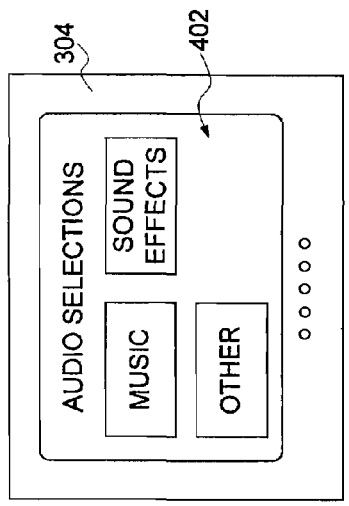
FIGS. 3–8 illustrate examples of actions that can be conducted using the system and client terminal of FIGS. 1 and 2, respectively, according to an embodiment of the invention.

FIG. 4 illustrates a situation where the user selects the audio content to accompany the shopping channel 302. The user is presented with a variety of audio content. The selection of available music audio content can be arranged by, but not limited to, by style of music (e.g., jazz, oldies, heavy metal, etc.), by individual song, by album, by artist, or by other classification(s). The user can also choose Internet radio stations as audio content. Audio content available for selection by the user also includes sound effects. The user can associate different sounds with various actions on the shopping channel 302, such as different sounds for clicking an icon, or when changing from one screen to another. In another embodiment, the audio portion of other content on the interactive television system 100 can be selected to accompany the shopping channel 302. For example, a user could choose to have the audio portion of a football game being shown on another channel as the audio content for the shopping channel 302.

The interactive television system 100 stores the user's audio content selections as user audio preferences. The user audio preferences can be stored in the client terminal 108, in the head-end 106, in one or more servers in the systems shown in FIG. 1, or in any suitable combination of these locations or other locations.

In an embodiment, the shopping channel 302 can be provided with one or more default audio settings. Thus, when the user first subscribes to the interactive television system 100 and tunes to the shopping channel 302 for the first time, the user is presented with the default audio content. As an example, the default audio content for an outdoors merchant advertising in the shopping channel 302 can have a theme that includes nature sounds, such as rushing water, chirping birds, and the like.

If the user desires to change the default settings, audio selections 402 in FIG. 4 may be made from a menu, preferences screen, or via other selection technique. In accordance with an embodiment of the invention, the audio selections 402 can be selected from audio, that is uploaded to a server by the user or other party, as will be described later below. Once the user's selections have been made, the selections can be stored as user preferences in an audio library collection and then applied during subsequent viewing of the shopping channel 302.

It is to be appreciated that the audio enhancements to the shopping experience on the shopping channel 302 may have several variations. For instance, as the theme of the music changes, so does the look of the shopping channel 302 (or vice versa). Thus, the audio enhancements that accompany the display of products may change when the user is taken to a screen where the user has to provide credit card information to finalize the purchase.

Figure 5:
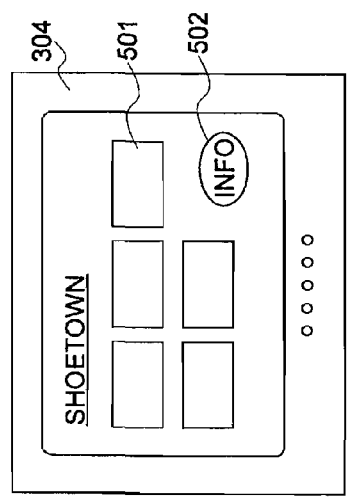

FIG. 5 illustrates a situation in which the user can select audio content to assist in an action on the shopping channel 302. In FIG. 5, the user is viewing the selections offered by the merchant "Shoetown." The user wants more information about a particular shoe 501. In one embodiment, the user can click on an "Info" icon 502 in a corner of the screen. The user hears the unique sound effect he has selected to associate with the "Info" button 502. The user can then click on the picture 501 of the shoe and an instructional voiceover gives more information about the shoe. In another embodiment, a voiceover can assist users as they go through the buying process. The voiceover tells the users how to enter credit card information, where to enter the mailing address, and so forth.

Figure 6:
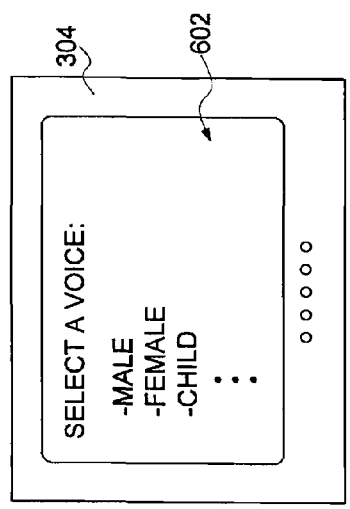

FIG. 6 illustrates a situation where the user can select a style 602 of voice played when the user selects an instructional voiceover on the shopping channel 302. The style of voices 602 include, but are not limited to, male, female, male child, a baritone male voice, a female New York accent, the voice of a famous actor, and the like. Thus, when the user wants instructions on the buying process on the shopping channel 302, the user hears the male voiceover the user had selected earlier.

In one embodiment, the audio content is stored in the interactive television system 100. Audio content servers 122 store audio content that can be selected by the user. However, audio content servers 122 are not limited to storing audio content. Any server providing content to the interactive television system 100 may be used to store audio content or other content, such as video or graphics.

Figure 7:
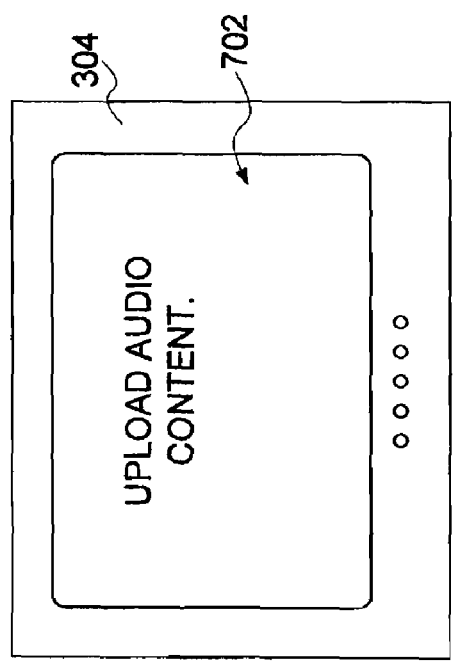

FIG. 7 illustrates a situation where the user can upload audio content to the interactive television system 100 via a user interface 702. In one embodiment, the user connects to the interactive television system 100 via the Internet 102 to upload audio content. The user can access the Internet 102 using, a conventional modem connection, a DSL connection, an integrated services digital network (ISDN) connection using a telephone line, a cable modem, a wireless connection, or the like. The audio content can be formatted as MP3, WAV, musical instrument digital interface (MIDI), or the like. The user can upload audio content to the interactive television system 100 via the Internet 102 using a personal computer, laptop computer, a personal digital assistant, a client terminal and the like that can display the user interface 702. The interactive television system 100 stores the uploaded audio content at a user storage medium. A storage medium for the uploaded audio content can be located in a set top box 108, in another device coupled to the television set 304, in a head-end 106, in one or more servers in the systems shown in FIG. 1, or in any suitable combination of these locations or other locations.

In one embodiment, the user can upload a human voice to the interactive television system 100 to be used as an instructional voiceover while the user is viewing the shopping channel 302. For example, a wife could speak into a microphone on a personal computer, a laptop, or the client terminal 108 and give instructions on how to complete a purchase. These instructions would be saved in a format as described earlier and then uploaded to the interactive television system 100. Later, when the husband goes to purchase an item, he can listen to his wife's voice giving him instructions on how to complete the sale. Another example, a mother could upload instructions to her child not to make a purchase in an amount exceeding the child's weekly allowance. When the child proceeds to purchase an item, the mother's voice reminds the child not to spend too much money.

In another embodiment, audio content on the shopping channel 302 is provided through explicit profiling by the interactive television system 100. When a user opens an account on the interactive television system 100, the system asks the user questions regarding the user's audio content preferences. The user may also request that the system re-ask the questions at anytime. From the answers to these questions, the interactive television system 100 develops user audio preferences. The user's audio preferences can be stored in the client terminal 108, in the head-end 106, in one or more servers in the systems shown in FIG. 1, or in any suitable combination of these locations or other locations. Thus, if the user does not actively select audio content pre-selected by the interactive television system 100 as described earlier, the interactive television system 100 provides audio content based on explicit profiling.

In another embodiment, audio content on the shopping channel 302 is provided based on implicit profiling. The interactive television system 100 monitors the user's viewing habits. By analyzing which interactive television content the user watches and how long the user watches them, the interactive television system 100 can develop user audio preferences. For example, if the user watches a lot of action television shows and movies, then the interactive television system 100 creates a user profile of high energy, exciting music. However, if the user watches many old movies from the 1940s and 1950s then the interactive television system 100 develops a user profile of big band music. User-selected audio content takes precedent over user audio preferences created through explicit profiling or implicit profiling in one embodiment.

Figure 8:
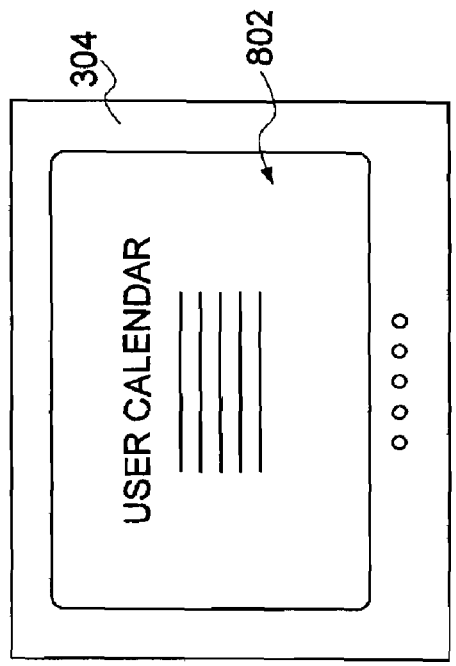

In another embodiment of the invention, the user can select the audio to accompany other content on the interactive television system 100. Other content of the interactive television system 100 includes, but is not limited to, Internet content and user objects. In one embodiment, the user uses the same methods as described above to select music while viewing Internet content on the World Wide Web (WWW). Thus, the user could select to listen to jazz music whenever the user opens a portal to view content on the World Wide Web. In another embodiment, the user can select the audio content to accompany interactive television user objects. These user objects include, but are not limited to, a user calendar, a user address book, a user recipe book, and the like. Thus, the user could select audio content so that whenever the user reviews his user calendar on the interactive television system 100 (as depicted at 802 in FIG. 8), the accompanying audio content is music by Mozart. In other embodiments, the explicit and implicit profiling methods described above can be used to develop an audio content user profile that can be applied to other content on the interactive television system 100.

In one embodiment, a user could view more than one interactive television content at a time. For example, with a "picture in picture" feature, a user could be watching a baseball game and place the user calendar 802 in the upper right corner of the television screen. The audio content correlates to the active window. Thus, if the user calendar 802 is the active window, then the audio content selected for the user calendar 802 becomes the audio content heard by the user. The user could choose to turn off the user calendar audio content, or choose to keep the user calendar 802 as the active window, but select the audio content of the baseball game.

Several techniques may be used to provide audio enhancements to the user while the user is viewing the shopping channel 302, including application of the user's preferences so as to provide customization of the audio enhancements. In one embodiment, triggers such as Advanced Television Enhancement Forum (ATVEF) triggers, can be embedded in the television signals sent to the client terminal 108. The triggers point to locations, such as to a URL address of the audio content sever 122, where the corresponding audio content may be retrieved for playback when a screen of the shopping channel 302 is displayed or when an icon is clicked by the user. The triggers embedded into the television signal can point to storage locations where the user has uploaded audio clips.

In another embodiment, the audio clips (or at least a portion thereof) can be transmitted to the client terminal 108 along with the television signals. The process of combining the audio with the video/images can be performed at a local studio, at the head-ends 106, at a master control location, or at other suitable locations in the interactive television system 100, such that stored audio clips and files can be retrieved and sent along with the video. In one embodiment, known television broadcasting, techniques can be used to provide the audio signals along with the video signals.

In yet another embodiment, files such as HTML files, can be provided to the client terminals 108 as part of the storefronts or catalogs displayed on the shopping channel 302. The HTML files can include tags, Java Script, or other type of machine-readable instruction to retrieve the audio content from the audio content server 122 (or from some other location) when the storefronts or catalogs are rendered on the television screen. Alternatively or in addition, Java Script or other code can be activated to retrieve and play the audio content in response to the user's clicking of an icon or when switching from one screen to another.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

For instance, while embodiments of the invention have been described herein as providing audio enhancements for the shopping channel 302, it is to be appreciated that audio enhancements can be provided for other types of channels. For instance, audio enhancements can be provided as instructional voiceovers for a house-building program, rather than for a purchase experience.

Furthermore, in addition to audio preferences, the user may set visual preferences. For example, the user may prefer to shop at the shopping channel 302 during Christmas season, with decorative Christmas graphics or video displayed on the storefront. Such visual preferences can be selected or set via a menu, similar to selecting and setting audio preferences. Video clips may be uploaded to a server and played back in a manner similar to the audio clips described above.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
   providing a user at a client terminal with a selection of audio content to accompany a shopping channel on an interactive video casting system, the user being an end consumer of advertising on the shopping channel, wherein the audio content to select from includes audio content previously uploaded by the user to the interactive video casting system and stored therein, the selection of audio content being made available via the shopping channel; and
   providing the selected audio content to the user.

2. The method of claim 1 wherein the audio content includes music selected from audio content stored on the interactive video casting system.

3. The method of claim 1 wherein the audio content includes an audio portion of programming from another channel on the interactive video casting system.

4. The method of claim 1 wherein the audio content includes Internet radio.

5. The method of claim 1 wherein the audio content previously uploaded by the user includes a voiceover to provide the user with instructions regarding actions on the shopping channel.

6. The method of claim 1 wherein the audio content includes a sound effect, including a style of voice capable of being selected by the user.

7. The method of claim 1 wherein the interactive video casting system comprises an interactive television system.

8. The method of claim 1, further comprising providing the audio content through explicit profiling of the user.

9. The method of claim 8 wherein explicit profiling comprises developing user audio preferences based on the user's responses to a plurality of questions provided via the interactive video casting system.

10. The method of claim 1, further comprising providing the audio content through implicit profiling of the user.

11. The method of claim 10 wherein implicit profiling comprises developing user audio preferences by analyzing the user's viewing habits in the interactive video casting system.

12. A method, comprising:
    providing a user at a client terminal with a selection of audio enhancements to accompany content on an interactive video casting system, the user being one of a plurality of end consumers viewing the content and the audio enhancements to select from including audio enhancements previously uploaded by the user to the interactive video casting system and stored therein; and
    providing the selected audio enhancements to the client terminal.

13. The method of claim 12 wherein the content comprises an Internet web site.

14. The method of claim 12 wherein the content comprises a shopping channel.

15. The method of claim 12 wherein the content comprises interactive television objects of the user, including an electronic calendar.

16. The method of claim 12 wherein the audio enhancements include music selected from audio enhancements stored on the interactive video casting system.

17. The method of claim 12 wherein the audio enhancements include an audio portion of other content available on the interactive video casting system.

18. The method of claim 12 wherein the audio enhancements comprise Internet radio.

19. The method of claim 12 wherein the audio enhancements comprise a sound effect, including a voice style capable of being selected by the user or a theme-based sound related to the content presented to the client terminal.

20. The method of claim 12 wherein the audio enhancements previously uploaded by the user comprise a voiceover to provide the user with instructions regarding actions related to the content presented to the client terminal.

21. The method of claim 12 wherein the interactive video casting system comprises an interactive television system.

22. The method of claim 12 wherein the content includes merchants' advertising, the method further comprising allowing merchants selling through a shopping channel of the interactive video casting system to provide a default audio enhancement to accompany the merchants' advertisement, the default audio enhancements capable of being changed by the user via selection of other audio enhancements.

23. The method of claim 12, further comprising selecting the accompanying audio enhancements based on explicit profiling by selecting the accompanying audio enhancements based on the user's responses to a plurality of questions presented via the interactive video casting system.

24. The method of claim 12, further comprising selecting the accompanying audio enhancements based on implicit profiling by the interactive video casting system by analyzing the user's viewing habits.

25. An apparatus, comprising:
a network interface coupled to receive interactive television content;
a storage medium coupled to the network interface to store at least a portion of a user's audio preferences and audio content uploaded by the user to the network interface;
a television interface coupled to the network interface to allow user selection of audio content including audio content stored in the storage medium, to accompany content received from an interactive television network, the user being one of a plurality of end consumers viewing the interactive television content;
a processor coupled to the storage medium to coordinate the user's audio preferences with the content received from the interactive television network by the network interface.

26. The apparatus of claim 25 wherein the content on interactive television comprises a shopping channel.

27. The apparatus of claim 25 wherein the network interface is capable to retrieve at least some audio information related to the preferences from the interactive television network via use of triggers embedded in the content received from the interactive television network.

28. A system, comprising:
a television network couplable to a communication network to provide content from the television network and from the communication network to a client terminal; and
a server capable of being coupled to the television network to provide access to audio enhancements, the server including a storage medium to store the audio enhancements, including audio enhancements previously uploaded by a user at the client terminal to the storage medium, wherein the server is further capable to provide the audio enhancements to the user at the client terminal based on user selection of at least one of the audio enhancements made from the content provided to the client terminal.

29. The system of claim 28 wherein the content includes triggers embedded in the content provided to the client terminal and usable to retrieve the at least one audio enhancement in response to user selection of that audio enhancement.

30. The system of claim 28, further comprising another storage medium coupled to the client terminal to store at least a portion of user audio preferences related to the audio enhancements.

31. A channel for an interactive video casting system, the channel comprising:
visual content provided from the interactive video casting system via the channel; and
a selection of audio enhancements to accompany the visual content, the audio enhancements including audio enhancements previously uploaded by a user at a client terminal to the interactive video casting system, the user being an end consumer of the content provided from the interactive video casting system, wherein at least one of the audio enhancements is capable of being provided via the channel in response to user selection of that audio enhancement.

32. The channel of claim 31 wherein the audio enhancements previously uploaded by the user include an instructional voiceover to provide instructions related to the visual content.

33. The channel of claim 31 wherein the audio enhancements include theme music based on the visual content, at least some of the theme music capable of being automatically selected from the selection based on user profile information.

34. The channel of claim 31, further comprising a selection of visual enhancements to accompany the visual content, at least some of the visual enhancements capable of being uploaded by the user for subsequent presentation along with the visual content, at least some of the visual enhancements capable of being automatically selected from the selection based on user profile information.

* * * * *